United States Patent
Dhuyvetter et al.

(10) Patent No.: US 7,921,308 B2
(45) Date of Patent: Apr. 5, 2011

(54) POWER SIGNAL MERGING FOR NETWORK INTERFACE DEVICES

(75) Inventors: Timothy A. Dhuyvetter, Arnold, CA (US); Sajol Ghoshal, El Dorado Hills, CA (US)

(73) Assignee: Akros Silicon, Inc., Folsom, CA (US)

( * ) Notice: Subject to any disclaimer, the term of this patent is extended or adjusted under 35 U.S.C. 154(b) by 880 days.

(21) Appl. No.: 11/753,428

(22) Filed: May 24, 2007

(65) Prior Publication Data

US 2008/0294918 A1   Nov. 27, 2008

(51) Int. Cl.
  *G06F 1/26* (2006.01)
(52) U.S. Cl. .......................... 713/300; 713/321; 363/65
(58) Field of Classification Search .................. 713/300, 713/321; 363/65
See application file for complete search history.

(56) References Cited

U.S. PATENT DOCUMENTS

| | | | |
|---|---|---|---|
| 5,781,419 A * | 7/1998 | Kutkut et al. | 363/17 |
| 6,191,957 B1 * | 2/2001 | Peterson | 363/17 |
| 6,496,394 B2 * | 12/2002 | Hanaoka et al. | 363/71 |
| 6,504,270 B1 * | 1/2003 | Matsushita | 307/140 |
| 6,594,163 B2 * | 7/2003 | Tsai | 363/50 |
| 7,046,533 B2 * | 5/2006 | Takemura et al. | 363/65 |
| 2006/0039169 A1 * | 2/2006 | Chen et al. | 363/17 |
| 2008/0151585 A1 * | 6/2008 | Kayano | 363/65 |

OTHER PUBLICATIONS

IIEE Computer Society. "Information technology—Telecommunications and information exchange between systems—Local and metropolitan area networks—Specific requirements. Part 3: Carrier Sense Multiple Access with Collision Detection (CSMA/CD) access method and physical layer specifications" [online], 2005, p. 1-810, [retrieved on May 30, 2010].*

* cited by examiner

*Primary Examiner* — Thuan N Du
(74) *Attorney, Agent, or Firm* — Koestner Bertani LLP; Mary Jo Bertani (57) ABSTRACT

Embodiments disclosed herein describe a network interface device including a first powered device controller coupled to first and second power supply lines. A second powered device controller coupled to third and fourth input power supply lines. A dc-dc converter coupled to receive a single signal representing a sum of power signals output by the first and second powered device controllers.

28 Claims, 5 Drawing Sheets

POWER SIGNAL MERGING FOR NETWORK INTERFACE DEVICES

BACKGROUND

Many networks such as local and wide area networks (LAN/WAN) structures are used to carry and distribute data communication signals between devices. Various network elements include hubs, switches, routers, and bridges, peripheral devices, such as, but not limited to, printers, data servers, desktop personal computers (PCs), portable PCs and personal data assistants (PDAs) equipped with network interface cards. Devices that connect to the network structure use power to enable operation. Power of the devices may be supplied by either an internal or an external power supply such as batteries or an AC power via a connection to an electrical outlet.

Some network solutions can distribute power over the network in combination with data communications. Power distribution over a network consolidates power and data communications over a single network connection to reduce installation costs, ensures power to network elements in the event of a traditional power failure, and enables reduction in the number of power cables, AC to DC adapters, and/or AC power supplies, which may create fire and physical hazards. Additionally, power distributed over a network such as an Ethernet network may function as an uninterruptible power supply (UPS) to components or devices that normally would be powered using a dedicated UPS.

SUMMARY

Embodiments disclosed herein describe Embodiments disclosed herein describe a network interface device including a first powered device controller coupled to first and second power supply lines. A second powered device controller coupled to third and fourth input power supply lines. A dc-dc converter coupled to receive a single signal representing a sum of power signals output by the first and second powered device controllers.

BRIEF DESCRIPTION OF THE DRAWINGS

Embodiments of the invention relating to both structure and method of operation may best be understood by referring to the following description and accompanying drawings.

DETAILED DESCRIPTION

The IEEE 802.3 Ethernet Standard, which is incorporated herein by reference, addresses loop powering of remote Ethernet devices (802.3af). Power over Ethernet (PoE) standard and other similar standards support standardization of power delivery over Ethernet network cables to power remote client devices through the network connection. The side of link that supplies power is called Powered Supply Equipment (PSE). The side of link that receives power is the Powered device (PD). Other implementations may supply power to network attached devices over alternative networks such as, for example, Home Phoneline Networking alliance (HomePNA) local area networks and other similar networks. HomePNA uses existing telephone wires to share a single network connection within a home or building. In other examples, devices may support communication of network data signals over power lines.

Figure 1A:
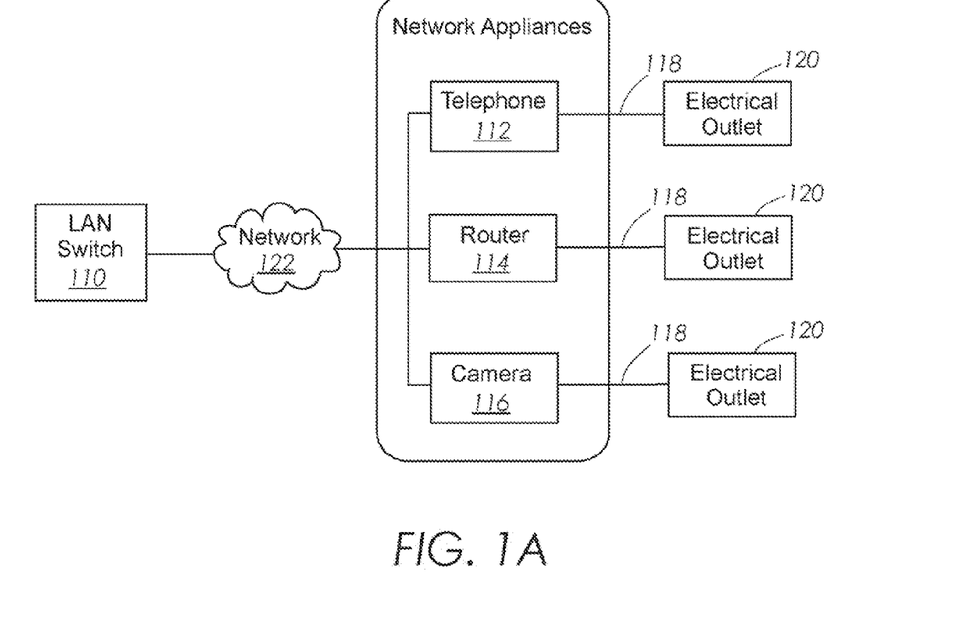
FIGS. 1A and 1B show embodiments of client devices in which power is supplied separately to network attached client devices, and a power-over Ethernet (PoE) enabled LAN switch that supplies both data and power signals to the client devices.
Figure 1B:
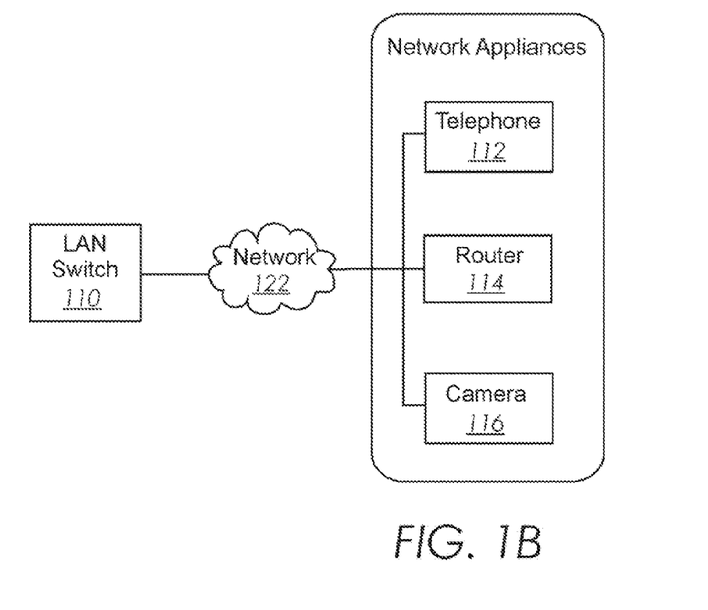

FIG. 1A is a schematic block diagram that illustrates a high level example embodiment of devices in which power is supplied separately to network attached client devices 112 through 116 that may benefit from receiving power and data via the network connection. The devices are serviced by a local area network (LAN) switch 110 for data. Individual client devices 112 through 116 have separate power connections 118 to electrical outlets 120. FIG. 1B is a schematic block diagram that depicts a high level example embodiment of devices wherein a switch 110 is a power supply equipment (PSE)-capable power-over Ethernet (PoE) enabled LAN switch that supplies both data and power signals to client devices 112 through 116. Network attached devices may include a Voice Over Internet Protocol (VOIP) telephone 112, access points, routers, gateways 114 and/or security cameras 116, as well as other network appliances. Network supplied power enables client devices 112 through 116 to eliminate power connections 118 to electrical outlets 120 as shown in FIG. 1A. Eliminating the second connection enables the network attached device to have greater reliability when attached to the network with reduced cost and facilitated deployment.

Although the description herein may focus and describe a system and method for coupling high bandwidth data signals and power distribution with particular detail to the IEEE 802.3af Ethernet standard, the concepts may be applied in non-Ethernet applications and non-IEEE 802.3af applications. Also, the concepts may be applied in subsequent standards that supersede or complement the IEEE 802.3af standard, such as HDSL (High bit-rate Digital Specific embodiments of the circuits and systems disclosed herein may be applied to various powered network attached devices or Ethernet network appliances. Such appliances include, but are not limited to VoIP telephones, routers, printers, and other suitable devices.

Figure 2A:
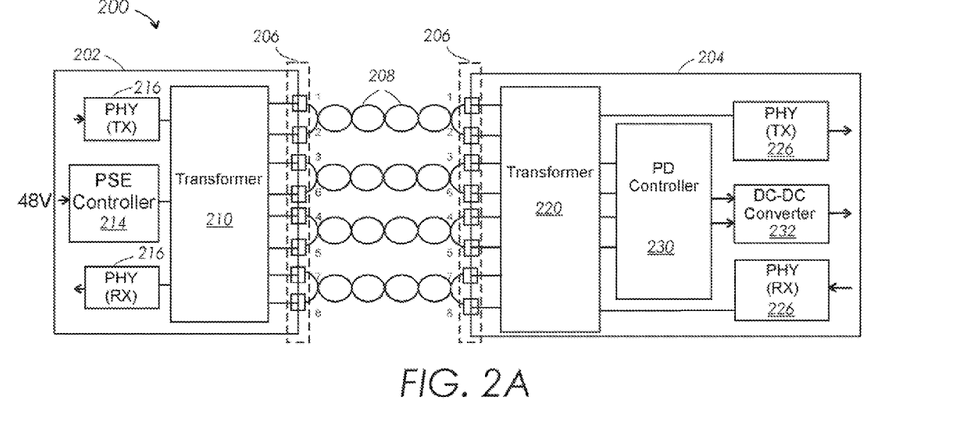
FIG. 2A shows an embodiment of a network interface device including a network powered device (PD) interface and a network power supply equipment (PSE) interface.

Referring to FIG. 2A, a functional block diagram depicts an embodiment of a network device 200 including power source equipment (PSE) interface 202 coupled to powered device (PD) interface 204 via respective network connectors

206 and multiple twisted pair conductors 208 between connectors 206. Twisted pair conductors 208 can be, for example, twisted 22-26 gauge wire and connectors 206 can be RJ-45 connectors. Other suitable conductors and connectors can be used.

In the embodiment shown, PSE interface 202 includes transformer 210 coupled between power source equipment (PSE) controller 214 and connector 206. Transformer 210 is also coupled between physical layer (PHY) device 216 and connector 206. Transformer 210 can be implemented as a magnetic transformer or in integrated circuitry to replace the functionality of a magnetic transformer. Replacing magnetic transformers with a solid state power feed circuit in the form of an integrated circuit or discreet component enables increased component density.

PD interface 204 can include transformer 220 coupled between another connector 206 and PHY device 226. Powered device controller 230 can be coupled between transformer 220 and DC-DC converter 232.

If the PD interface 204 is used in an Ethernet network, PD interface 204 may support the 10/100/1000 Mbps data rate and other future data networks such as a 10000 Mbps Ethernet network as well as other Ethernet data protocols that may arise. An Ethernet PHY device 226 may additionally couple to an Ethernet media access controller (MAC) (not shown). The PHY device 226 and Ethernet MAC when coupled can implement the hardware layers of an Ethernet protocol stack. The architecture may also be applied to other networks and protocols. If a power signal is not received but a traditional, non-power Ethernet signal is received at connector 206, the PD interface 204 still passes the data signal to the PHY device 226.

PSE interface 202 and PD interface 204 may be applied to an Ethernet application or other network-based applications such as, but not limited to, a vehicle-based network such as those found in an automobile, aircraft, mass transit system, or other like vehicle. Examples of specific vehicle-based networks may include a local interconnect network (LIN), a controller area network (CAN), or a flex ray network. All may be applied specifically to automotive and aircraft networks for the distribution of power and data to various monitoring circuits or for the distribution and powering of entertainment devices, such as entertainment systems, video and audio entertainment systems often found in today's transportation. Other networks may include a high speed data network, low speed data network, time-triggered communication on CAN (TTCAN) network, a J1939-compliant network, ISO11898-compliant network, an ISO11519-2-compliant network, as well as other similar networks. Other embodiments may supply power to network attached devices over alternative networks such as but not limited to a HomePNA local area network and other similar networks. HomePNA uses existing telephone wires to share a single network connection within a home or building. Alternatively, embodiments may be applied where network data signals are provided over power lines.

In some embodiments, transformers 210, 220, PHY devices 216, 226, PSE controller 214, PD controller 230, and converter 232 may be implemented in integrated circuits rather than discrete components at the printed circuit board level. The circuits may be implemented in any appropriate process, for example, power components may be implemented using a high voltage silicon on insulator process whereas other components can be implemented using a 0.18 or 0.13 micron process or any suitable process.

Network device 200 may implement functions including IEEE 802.3.af signaling and load compliance, local unregulated supply generation with over current protection, and signal transfer between the lines 208 between connectors 206 and integrated Ethernet PHY devices 216, 226. Since devices are directly connected to the line 208, the device 200 may be implemented to withstand a secondary voltage surge.

Transformer 210 may take the form of a single or multiple port switch to supply power to single or multiple devices attached to the network. Power sourcing equipment interface 202 may be operable to receive power and data signals and combine to communicate power signals which are then distributed via an attached network. If power sourcing equipment interface 202 is included in a gateway or router computer, a high-speed uplink couples to a network such as an Ethernet network or other network.

Power sourcing equipment (PSE) controller circuit 214 implemented within or coupled to transformer 210 may determine, in accordance with IEEE standard 802.3af or other suitable standard, whether a network-attached device is operable to receive power via PD interface 204. When determined that a compliant powered device (PD) is attached to the network, PSE controller circuit 214 may supply power from power supply to transformer 210. The power is sent to the downstream network-attached device through network connectors 206, which in the case of the Ethernet network may be an RJ45 receptacle and cable.

In the context of an Ethernet network interface, network connector 206 may be a RJ45 connector operable to receive a number of twisted pairs. Protection and conditioning circuitry may be located between network connector 206 and transformer 220 to provide surge protection in the form of voltage spike protection, lighting protection, external shock protection or other like active functions known to those having skill in the art. Conditioning circuitry may take the form of a diode bridge or other like rectifying circuit. Such a diode bridge may couple to individual conductive lines 1-8 contained within the RJ45 connector 206. These circuits may be discrete components or an integrated circuit within transformer 220.

Power device manager 230 may be used to control power supply to network attached devices. Typically the power signal received does not exceed 57 volts SELV (Safety Extra Low Voltage). Typical voltage in an Ethernet application is 48-volt power. Converter 232 may then further transform the power to provide 1.8 to 12 volts, or other voltages specified by many Ethernet network attached devices, such as wireless access point circuitry or IP telephony circuitry.

In instances where network interface 204 is used to couple the network attached device or PD to an Ethernet network, network physical layer 226 may be operable to implement the 10 Mbps, 100 Mbps, and/or 1 Gbps physical layer functions as well as other Ethernet data protocols that may be used. The Ethernet PHY 226 may additionally couple to an Ethernet media access controller (MAC). The Ethernet PHY 226 and Ethernet MAC when coupled are operable to implement the hardware layers of an Ethernet protocol stack. This architecture may also be applied to other networks.

The power signal is provided to dc-dc converter 232. Typically the power signal received will not exceed 57 volts SELV (Safety Extra Low Voltage). Typical voltage in an Ethernet application will be 48 -volt power. Dc-dc converter 232 may then further transform the power in order to provide 1.8 to 3.3 volts, or other voltages as may be required by many Ethernet network attached devices. Any one of the conductors 1, 4, 7, or 3 of the network RJ45 connection can forward bias to deliver current and any one of the return diodes connected can forward bias provide a return current path via one of the remaining conductors. Conductors 2, 5, 8, and 4 are connected in a similar fashion.

The IEEE 802.3af standard defines two different types of PSEs 202: endspan and midspan. FIG. 2A shows an endspan PSE 202 that integrates the power sourcing functionality with a network switch. Since Ethernet data pairs use transformers 210, 220 coupled at each end of lines 208, DC power can be added to the center tap of the transformers 210, 220 without disrupting the data. In this mode of operation, an endspan PSE 202 injects both power and data on pin-pairs 3 and 6 and pin-pairs 1 and 2, while pin-pairs 4-5 and 7-8 are spare (unused).

Figure 2B:
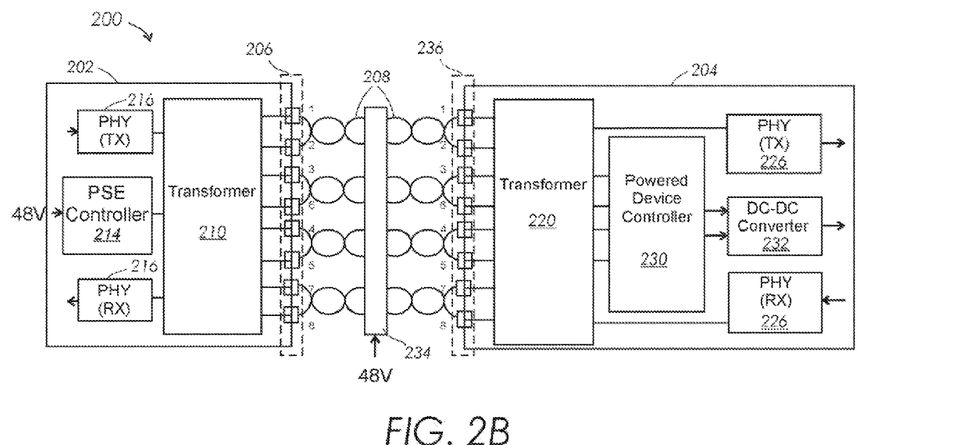
FIG. 2B shows another embodiment of a network interface device including a network powered device (PD) interface and a network power supply equipment (PSE) interface.

FIG. 2B shows another embodiment of network device 200 including a mid-span device 234 between PSE connector 206 and PD connector 236. Midspan device 234 can be configured to operate with or without an endspan PSE 202. Data and power are supplied to PD 204 via pin-pairs 1-2 and 3-6 when an endspan PSE 202 is utilized, whereas power is supplied over the spare cable pin-pairs 4 and 5 and pin-pairs 7 and 8 when an endspan PSE 202 is not utilized. Data is routed through the midspan device 234 without modification via pin-pairs 1-2 and 3-6 whether or not an endspan PSE 202 is utilized.

Figure 3A:
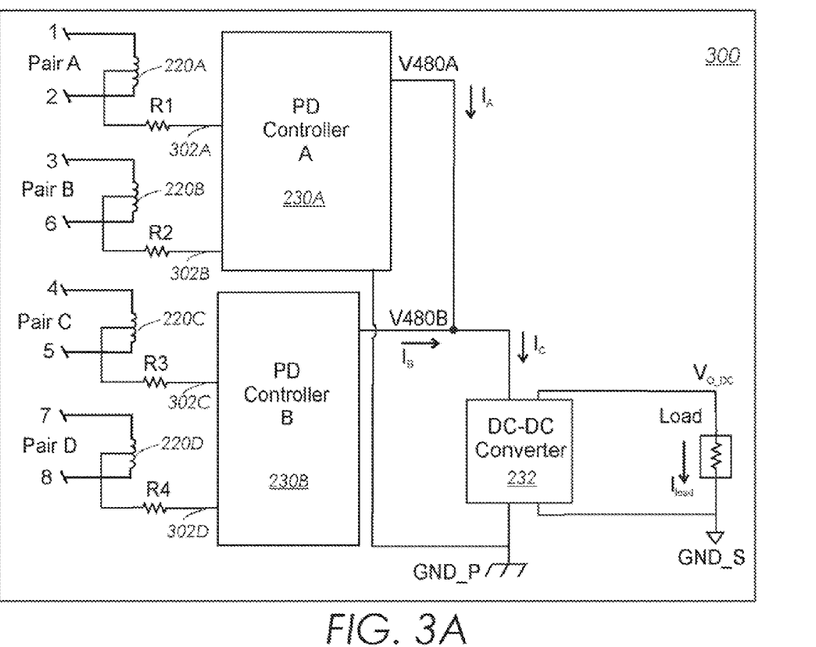
FIG. 3A is a diagram of a configuration for a powered device network interface device for merging multiple power signals in accordance with an embodiment of the invention.

Referring to FIG. 3A, a diagram of components suitable for use in at least a portion of PD interface 204 in FIGS. 2A and 2B is shown. PD interface 300 includes transformer circuits 220A-D connected across line pairs 1 and 2 (Pair A), 3 and 6 (Pair B), 4 and 5 (Pair C), and 7 and 8 (Pair D). Each pair A-B is bidirectional with a forward path and return path. Pairs can be switched back and forth between forward and return paths.

A first powered device controller 230A is coupled to first and second power supply lines 302A, 302B from transformers 220A, 220B, respectively. A second powered device controller 230B is coupled to third and fourth input power supply lines 302C, 302D from transformers 220C, 220D. A dc-dc converter 232 is coupled to receive a single signal representing a sum of power signals output by the first and second powered device controllers. In particular, $$P_{out}=(V_{0\_DC})(I_{Load})=(V480)(I_{In\_T})/\eta$$

where $\eta$=efficiency.

$$I_{In\_T}=I_A+I_B=I_C$$

where $I_A$ and $I_B$ are currents output by respective powered device controllers 230A, 230B and $V_{480A}$ and $V_{480B}$ are voltages output by respective powered device controllers 230A, 230B.

$$P_{InA}=(V_{480A})(I_A)$$

$$P_{InB}=(V_{480B})(I_B)$$

$$P_{InA}=P_{InB}=\tfrac{1}{2}P_{In\_Total}$$

The power supply lines 302A-302D are coupled to a center tap of the respective transformers 220A-220D. In the case of the 802.3.af Ethernet standard, power is delivered via the center tap of the transmit transformer and receive signal transformers for transformer based designs. The embodiments of the present invention may take up to 400ma DC from the common mode of the signal pair without disturbing the AC (1 MHz-100 MHz) differential signals on the transmit/receive pairs.

Transformers 220A-D couple directly to the line and provide high differential impedance and low common mode impedance. High differential impedance allows separation of the data signal to the PHY device from the power signal. The low common mode impedance removes the need for a choke circuit. This allows power to be tapped from the line. The local ground plane may float in order to eliminate the need for 1500 volt isolation. Additionally through a combination of circuit techniques and lightning protection circuitry, it is possible to provide voltage spike or lightning protection to the network attached device. It should be understood that the technology may be applied anywhere where transformers are used and should not be limited to Ethernet applications.

Ballast resistors R1-R4 are coupled between the center tap of respective transformers 220A-220D and powered device controllers 230A, 230B. The ballast resistors R1-R4 can be adjusted to provide the same common mode voltage, thereby correcting for any difference in length of supply lines 302A-302D, or other causes of variation in the voltage from transformers 220A, 220B.

The dc-dc converter 232 is coupled to an earth ground plane (GND_P). A feedback signal (not shown) may be coupled between the output of the dc-dc converter 232 and one of the powered device controllers 230A, 230B to enable the amount of current being supplied to converter 232 to be regulated.

Figure 3B:
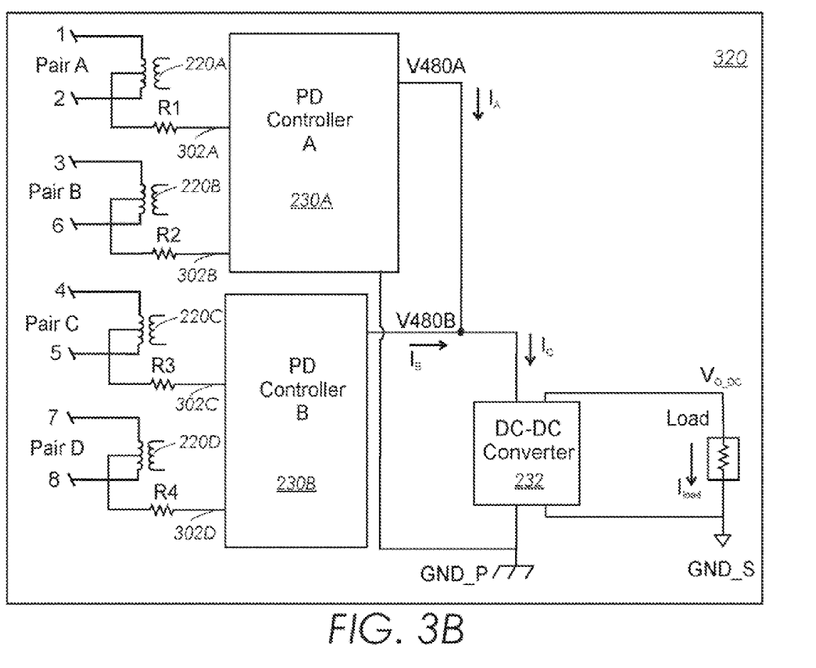
FIG. 3B is a diagram of another configuration for a powered device network interface device for merging multiple power signals in accordance with an embodiment of the invention.

Referring to FIG. 3B, another diagram of components suitable for use in at least a portion of PD interface 204 in FIGS. 2A and 2B is shown. PD interface 320 includes auto-former circuits 220A-D connected across line pairs 1 and 2 (Pair A), 3 and 6 (Pair B), 4 and 5 (Pair C), and 7 and 8 (Pair D). Each pair A-B is bidirectional with a forward path and return path. Pairs can be switched back and forth between forward and return paths. Auto-formers 220A-D can be used to reduce the size of the transformer required to separate power signals from data signals. It is expected that the autoformers 220A-D will require at least 10×-100× less volume than a conventional transformer. The autoformers 220A-D typically increase the impedance for data signals, and act as a short circuit during over-voltage and over-current events. As a result, surge current will flow through a protection circuit, thereby preventing damage to connected devices.

Furthermore, conventional transformers can create insertion loss and return loss as well as limit high frequency performance. Replacing a conventional transformer with an autoformers 220A-D can remove a major source of data signal degradation and help enable high speed operation, for example, Gigabit and 10 Gigabit operation.

Figure 4:
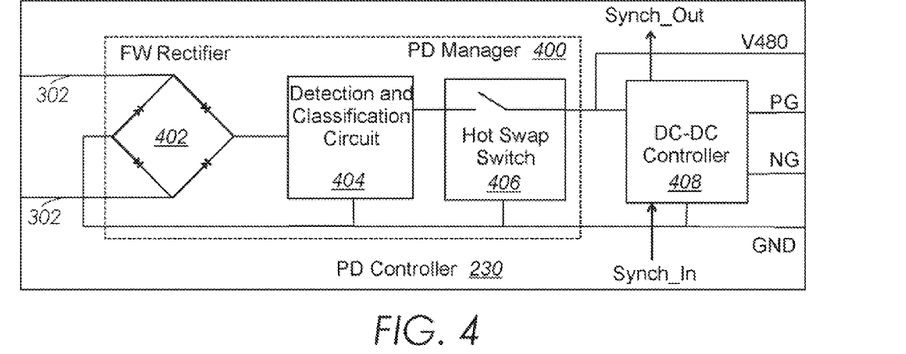
FIG. 4 is a diagram of an example of a configuration for a powered device controller that can be used in the network interface device of FIG. 3.

Referring to FIG. 4, an embodiment of components included in a typical powered device controller 230 is shown including a powered device manager 400 and dc-dc controller 408. In the embodiment shown, powered device manager 400 includes a rectifier 402, a classification circuit 404, and a hot swap switch 406. Rectifier 402 converts bidirectional signals to unidirectional signals to ensure proper signal polarity is applied to DC-DC converter 232. The diode bridge rectifier 402 is coupled to first and second power supply lines 302. The PSE device 202 (e.g., FIG. 2A) typically sources power through lines 3, 4, 5, and 6 of the network connectors 206, however, other lines can be used. Rectifiers 402 may be a diode bridge or other rectifying component or device. The circuits may be discrete components or an integrated circuit. Any one of a subset of the twisted pair conductors 208 (FIG. 2A) can forward bias to deliver current, and the rectifiers 402 can forward bias a return current path via a remaining conductor of the subset.

A signal classifier 404 is coupled to receive output from the rectifier 402 and responds to tests by the PSE 202 (FIG. 2) to determine whether a valid device is connected. A hot swap switch 406 may be included to allow devices to be added or removed without interrupting operation. A dc-dc controller 408 can be included and configured to receive input from the signal classifier 404 or hot swap switch 406 as well as a feedback signal line from the dc-dc converter 232, thus allowing dc-dc controller 408 to adjust the level of current being supplied. Synchronization signals, shown as Synch_In and Synch_Out, can be input to and output by dc-dc controller 408 to synchronize operation of the dc-dc converter 232 (FIG. 2).

Figure 5:
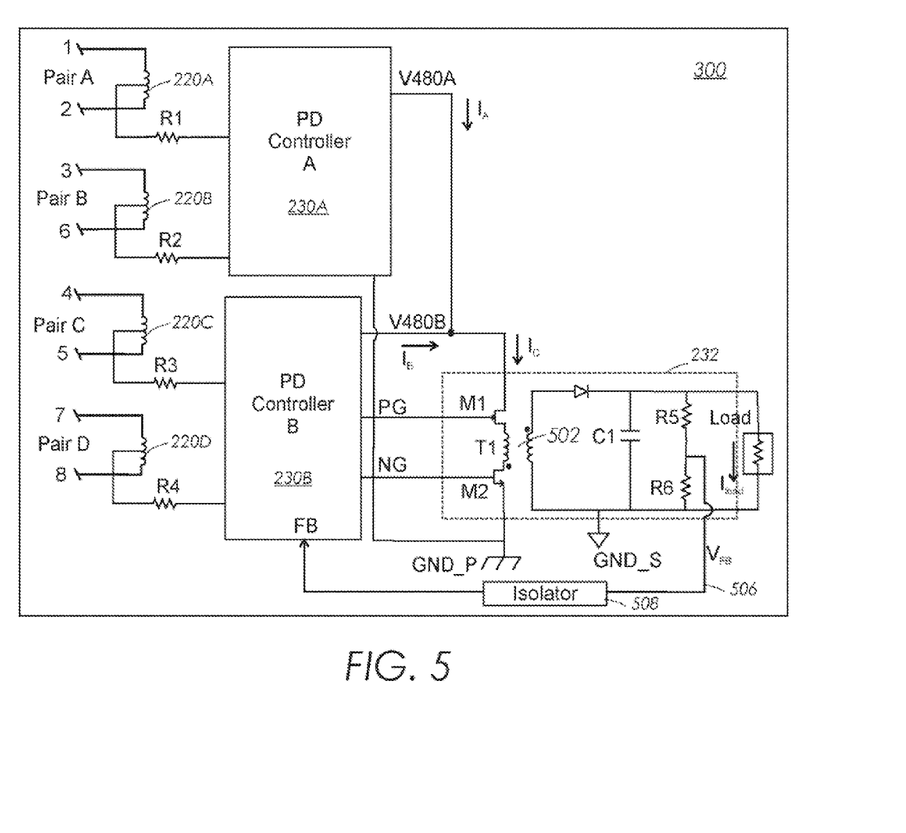
FIG. 5 is a diagram of a powered device network interface device for merging multiple power signals in accordance with another embodiment of the invention.

Referring to FIG. 5, another embodiment of network device 300 for merging power signals is shown with a dc-dc converter 232 that includes a full bridge mode transformer 502. Dc-dc converter 232 further includes a first switch M1 coupled to one end of a primary winding of transformer 502 and further coupled to receive the signal representing the sum of power signals output by the first and second powered device controllers 230A, 230B. A second switch M2 in the dc-dc converter 232 is coupled between another end of the primary winding of transformer 502 and earth ground.

In the embodiment shown, the first and second switches M1, M2 are transistors. The gates of the transistors are coupled to the dc-dc controller 408 (FIG. 4) in the second powered device controller 230B, however, the dc-dc converter 232 can be coupled to either powered device controller 230A, 230B.

A secondary winding of the power conversion transformer 502 is coupled across a load. A diode 504 is coupled in series between one end of the secondary winding and the load. A capacitor C1 is coupled to a ground plane in parallel between the secondary winding and the load. A resistor R5 is coupled in series with another resistor R6. The resistors R5, R6 are coupled in parallel between the capacitor C1 and the load. A voltage feedback signal 506 can be tapped between resistors R5 and R6 and supplied to one of PD controllers 230A or 230B. An isolator circuit 508 can be coupled to the voltage feedback signal 506 to prevent surge events from damaging components in PD controllers 230A, B.

Note that other suitable dc-dc converters 232 can be used in the network device 300, such as push-pull, bridge mode, resonate, and/or any converter with differentially driven topology (i.e., where the primary side inductance/winding is driven differentially.)

Figure 6:
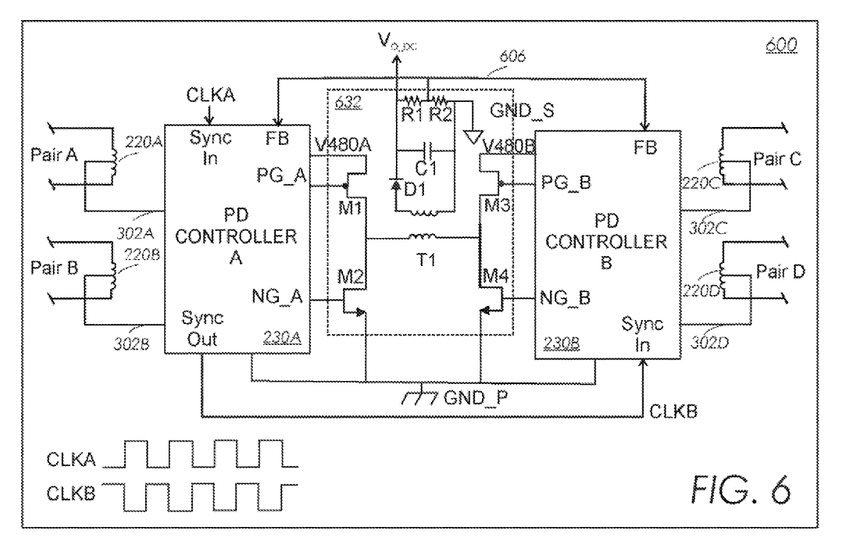
FIG. 6 is a diagram of a powered device network interface device for merging multiple power signals in accordance with another embodiment of the invention.

Referring now to FIG. 6, an embodiment of a network interface device 600 capable of merging multiple power input signals is shown including a first powered device (PD) controller 230A coupled to first and second power supply lines 302A, 302B and to a ground plane. A second PD controller 230B is coupled to third and fourth input power supply lines 302A, 302B and to the ground plane. The power supply lines 302A-302D are coupled to a center tap of the respective transformers 220A-220D. A dc-dc converter 632 includes a first pair of switches M1, M2 coupled in series and receiving a power signal output by the first powered device controller 230A. A second pair of switches M3, M4 are coupled in series and receive a power signal output by the second powered device controller 230B. The PD controllers 230A, 230B, dc-dc converter 632, and switches M2 and M4 are coupled to an earth ground plane (GND_P).

A primary transformer winding T1 is coupled between the first and second pair of switches M1/M2 and M3/M4 to receive power signals output by the first and second powered device controllers 230A, 230B. A first clock signal CLK_A is supplied to PD controller 230A from an internal or external clock source. A second clock signal CLK$_{13}$B is supplied from PD controller 230A to PD controller 230B. In the embodiment shown, digital CLK_A and CLK_B signals are driven opposite one another so that switches M1/M4 and M2/M3 are driven out-of-phase. In other embodiments, the gates of switches M2 and M4 may be crisscrossed and driven in-phase. Other suitable devices can be used for switches M1-M4 in addition to or instead of transistors. Dc-dc converter 632 may be a push-pull converter or any other suitable type of converter that uses a transformer with a single primary winding that is driven differentially.

In the embodiment shown, the switches M1-M4 are transistors with gates. The gates of the first pair of transistors M1, M2 are coupled to the first powered device controller 230A, and the gates of the second pair of transistors M3, and M4 are coupled to the second powered device controller 230B. A secondary winding of the power conversion transformer T1 is coupled across a load. A diode D1 is coupled in series between one end of the secondary winding and the load. A capacitor C1 is coupled to a ground plane in parallel between the secondary winding and the load. A resistor R1 is coupled in series with another resistor R2. The resistors R1, R2 are coupled in parallel between the capacitor C1 and the load. A voltage feedback signal 606 can be tapped between resistors R1 and R2 and supplied to PD controllers 230A and 230B to enable the amount of current being supplied to converter 632 to be regulated.

Powered device controller 230A is coupled to first and second power supply lines 302A, 302B from transformers 220A, 220B, respectively. Powered device controller 230B is coupled to third and fourth input power supply lines 302C, 302D from transformers 220C, 220D. Transformer T1 is coupled to receive a single signal representing a sum of power signals output by the first and second powered device controllers 230A, 230B.

Figure 7:
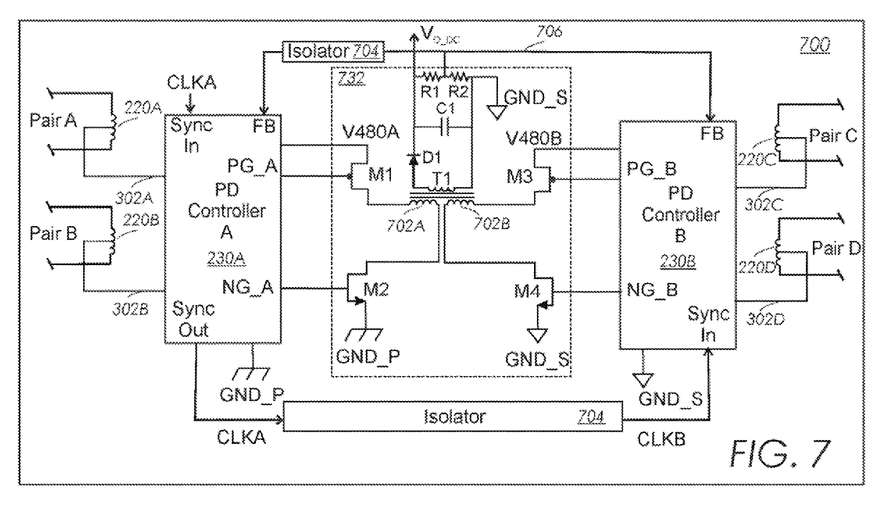
FIG. 7 is a diagram of a configuration for a powered device network interface device for synchronous merging multiple power signals in accordance with another embodiment of the invention.

Referring now to FIG. 7, an embodiment of a network interface device 700 is shown including a first powered device controller 230A coupled to first and second power supply lines 302A, 302B and to a primary (earth) ground plane. A second powered device controller 230B is coupled to third and fourth input power supply lines 302C, 302D and to a secondary ground plane. A dc-dc converter 732 includes a first and second switch M1, M2 coupled in series with a first secondary transformer winding 702A. The first switch M1 is coupled to receive a respective power signal output by the first powered device controller 230A. The second switch M2 is coupled to the primary ground plane.

Third and fourth switches M3, M4 are coupled in series with a second secondary transformer winding 702B. The third switch M3 is coupled to receive a respective power signal output by the second powered device controller 230B. The fourth switch M4 is further coupled to the secondary ground plane.

A primary transformer winding T1 is configured to receive power signals output by the first and second secondary transformers 702A, 702B. An isolator circuit 704 can be coupled to the PD controllers 230A, 230B to prevent surge events from damaging components in PD controllers 230A, B. The isolator circuit 704 can also provide first and second clock signals CLK_A, CLK_B to respective PD controllers 230A, 230B to synchronize operation of the first and third switches M1, M3.

In the embodiment shown, the first, second, third, and fourth switches M1-M4 are transistors with gates. Other suitable devices can be used for switches M1-M4 in addition to or instead of transistors. The gate of the first transistor is coupled to the first powered device controller 230A, and the gate of the third transistor is coupled to the second powered device controller 230B. The primary winding of the power conversion transformer T1 is couplable to a load. A diode D1 is coupled in series between the secondary winding and the load. A capacitor C1 is coupled to a ground plane in parallel between the secondary winding and the load. A first resistor is coupled in series with a second resistor. The first and second resistors coupled in parallel between the capacitor and the load. A voltage feedback signal 706 can be tapped between resistors R1 and R2 and supplied to PD controllers 230A and 230B to enable the amount of current being supplied to converter 732 to be regulated.

Note that embodiments of powered device interface modules 204, 300, 500, 600, 700 may be configured to handle as many input power lines as required. Accordingly, as many powered device controllers 230 as required can also be included to handle additional inputs. Additionally, power may be supplied via transformers 220A-D (FIGS. 3A, 5, 6, 7) or autoformers 220A-D (FIG. 3B) in the powered device interface modules 204, 300, 500, 600, 700.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, component values, integrated circuit process variations, temperature variations, rise and fall times, and/or thermal noise. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, various aspects or portions of a network interface are described including several optional implementations for particular portions. Any suitable combination or permutation of the disclosed designs may be implemented.

What is claimed is:

1. A network interface device comprising:
 a first powered device controller coupled to first and second power supply lines;
 a second powered device controller coupled to third and fourth input power supply lines; and
 a dc-dc converter coupled to receive a single signal representing a sum of power signals output by the first and second powered device controllers, wherein the dc-dc comprising:
  a first switch coupled to one end of a primary winding of a power conversion transformer and further coupled to receive the signal representing the sum of power signals output by the first and second powered device controllers; and
  a second switch coupled between another end of the primary winding and earth ground.

2. The network device according to claim 1 further comprising:
 a first transformer coupled to a first pair of input lines;
 the first power supply line is coupled to a center tap of the first transformer;
 a second transformer coupled to a second pair of input lines; and
 the second power supply line is coupled to a center tap of the second transformer.

3. The network device according to claim 2 further comprising:
 a third transformer coupled to a third pair of input lines;
 the third power supply line is coupled to a center tap of the third transformer;
 a fourth transformer coupled to a fourth pair of input lines; and
 the fourth power supply line is coupled to a center tap of the fourth transformer.

4. The network device according to claim 3 further comprising:
 a first ballast resistor coupled between the center tap of the first transformer and the first powered device controller; and
 a second ballast resistor coupled between the center tap of the second transformer and the first powered device controller.

5. The network device according to claim 4 further comprising:
 a third ballast resistor coupled between the center tap of the third transformer and the second powered device controller; and
 a fourth ballast resistor coupled between the center tap of the fourth transformer and the second powered device controller.

6. The network device according to claim 1 further comprising:
 an earth ground plane coupled to the dc-dc converter.

7. The network device according to claim 1 further comprising:
 a feedback signal line coupled between an output of the dc-dc converter and one of the group consisting of the first and second powered device controllers.

8. The network device according to claim 7 wherein the first powered device controller includes:
 a rectifier coupled to the first and second power supply lines;
 a signal classifier coupled to receive output from the rectifier; and
 a dc-dc controller configured to receive input from the signal classifier and the feedback signal line.

9. The network device according to claim 7 wherein the second powered device controller includes:
 a rectifier coupled to the third and fourth power supply lines;
 a signal classifier coupled to receive output from the rectifier; and
 a dc-dc controller configured to receive input from the signal classifier and the feedback signal line.

10. The network device according to claim 1 further comprising:
 the dc-dc converter includes a full bridge mode transformer.

11. The network device according to claim 1 further comprising:
 the first and second switches are transistors and gates of the transistors are coupled to a dc-dc controller in the second powered device controller.

12. The network device according to claim 1 further comprising:

a secondary winding of the power conversion transformer, the secondary winding is couplable across a load;
a diode coupled in series between one end of the secondary winding and the load;
a capacitor coupled to a ground plane in parallel between the secondary winding and the load; and
a first resistor coupled in series with a second resistor, the first and second resistors coupled in parallel between the capacitor and the load.

13. A network interface device comprising:
a first powered device controller coupled to first and second power supply lines and to a ground plane;
a second powered device controller coupled to third and fourth input power supply lines and to the ground plane;
a dc-dc converter including:
 a first pair of switches coupled in series and to receive a respective power signal output by the first powered device controller, one of the first pair of switches coupled to the ground plane;
 a second pair of switches coupled in series and to receive a respective power signal output by the second powered device controller, one of the second pair of switches coupled to the ground plane; and
 a secondary transformer winding coupled between the first and second pair of switches to receive power signals output by the first and second powered device controllers.

14. The network device according to claim 13 further comprising:
a first transformer coupled to a first pair of input lines;
the first power supply line is coupled to a center tap of the first transformer;
a second transformer coupled to a second pair of input lines; and
the second power supply line is coupled to a center tap of the second transformer.

15. The network device according to claim 14 further comprising:
a third transformer coupled to a third pair of input lines;
the third power supply line is coupled to a center tap of the third transformer;
a fourth transformer coupled to a fourth pair of input lines; and
the fourth power supply line is coupled to a center tap of the fourth transformer.

16. The network device according to claim 13 further comprising:
a feedback signal line output by the dc-dc converter and coupled to at least one of the group consisting of the first and second powered device controllers.

17. The network device according to claim 16 wherein the first powered device controller includes:
a rectifier coupled to the first and second power supply lines;
a signal classifier coupled to receive output from the rectifier; and
a dc-dc controller configured to receive input from the signal classifier.

18. The network device according to claim 16 wherein the second powered device controller includes:
a rectifier coupled to the third and fourth power supply lines;
a signal classifier coupled to receive output from the rectifier; and
a dc-dc controller configured to receive input from the signal classifier and the feedback signal line.

19. The network device according to claim 13 further comprising:
the dc-dc converter includes at least one of the group consisting of: a push-pull converter, a bridge-mode converter, a resonate converter, and a converter wherein a primary winding is driven differentially.

20. The network device according to claim 13 further comprising:
the first and second pairs of switches are transistors with gates,
the gates of the first pair of transistors are coupled to the first powered device controller, and
the gates of the second pair of transistors are coupled to the second powered device controller.

21. The network device according to claim 13 further comprising:
a primary winding of the power conversion transformer couplable to a load;
a diode coupled in series between the primary winding and the load;
a capacitor coupled to a ground plane in parallel between the primary winding and the load; and
a first resistor coupled in series with a second resistor, the first and second resistors coupled in parallel between the capacitor and the load.

22. A network interface device comprising:
a first powered device controller coupled to first and second power supply lines and to a primary (earth) ground plane;
a second powered device controller coupled to third and fourth input power supply lines and to a secondary ground plane;
a dc-dc converter including:
 first and second switches coupled in series with a first secondary transformer winding, the first switch Ml is coupled to receive a respective power signal output by the first powered device controller;
 the second switch coupled to the primary ground plane;
 third and fourth switches coupled in series with a second secondary transformer winding, the third switch coupled to receive a respective power signal output by the second powered device controller,
 the fourth switch further coupled to the secondary ground plane; and
 a primary transformer winding configured to receive power signals output by the first and second secondary transformers.

23. The network device according to claim 22 further comprising:
an isolator circuit coupled to the powered device controllers to prevent surge events from damaging components in the powered device controllers.

24. The network device according to claim 23 further comprising:
a first clock signal received by the isolator circuit from the first powered device controller; and
a second clock signal output by the isolator circuit and received by the second powered device controller.

25. The network device according to claim 22 wherein the first powered device controller includes:
a first rectifier coupled to the first and second power supply lines;
a first signal classifier coupled to receive output from the rectifier;
a first dc-dc controller configured to receive input from the first signal classifier a second rectifier coupled to the third and fourth power supply lines;

a second signal classifier coupled to receive output from the second rectifier; and a second dc-dc controller configured to receive input from the second signal classifier.

26. The network device according to claim 22 further comprising:

the first, second, third, and fourth switches are transistors with gates, the gate of the first transistor is coupled to the first powered device controller, and the gate of the third transistor is coupled to the second powered device controller.

27. The network device according to claim 22 further comprising:

a primary transformer winding couplable to a load;

a diode coupled in series between the primary transformer winding and the load;

a capacitor coupled in parallel between the primary transformer winding and the load; and a first resistor coupled in series with a second resistor, the first and second resistors coupled in parallel between the capacitor and the load.

28. The network device according to claim 22 further comprising:

a feedback signal line output by the dc-dc converter and coupled to at least one of the group consisting of the first and second powered device controllers.

* * * * *